(12) United States Patent
Youngblutt et al.

(10) Patent No.: US 11,104,560 B2
(45) Date of Patent: Aug. 31, 2021

(54) ADJUSTABLE POSITIONING ARMS FOR TRANSMISSION JACK SADDLE

(71) Applicant: PROFESSIONAL TOOL PRODUCTS, LLC, Travelers Rest, SC (US)

(72) Inventors: Sage Youngblutt, Taylors, SC (US); Robert Fox, Greenville, SC (US); Nathan Harvell, Greenville, SC (US); Stephen Cain, Greer, SC (US)

(73) Assignee: VIS, LLC, Greer, SC (US)

( * ) Notice: Subject to any disclaimer, the term of this patent is extended or adjusted under 35 U.S.C. 154(b) by 218 days.

(21) Appl. No.: 15/691,882

(22) Filed: Aug. 31, 2017

(65) Prior Publication Data

US 2018/0079635 A1    Mar. 22, 2018

Related U.S. Application Data (60) Provisional application No. 62/395,422, filed on Sep. 16, 2016.

(51) Int. Cl.
*B66F 13/00* (2006.01)
*F16M 11/04* (2006.01)

(52) U.S. Cl.
CPC ............. *B66F 13/00* (2013.01); *F16M 11/04* (2013.01); *F16M 2200/066* (2013.01)

(58) Field of Classification Search
CPC .... B66F 13/00; B66F 5/00; B66F 9/00; B66F 9/12; F16M 2200/066; F16M 11/04
USPC ................. 254/108, 134, 133, 2 B
See application file for complete search history.

(56) References Cited

U.S. PATENT DOCUMENTS

| | | | | |
|---|---|---|---|---|
| 1,363,020 A | * | 12/1920 | Shewalter | B25H 1/0007 269/17 |
| 2,523,734 A | * | 9/1950 | Stephenson | B23P 19/00 254/2 B |
| 2,637,449 A | * | 5/1953 | Hamer | B66F 13/00 248/180.1 |
| 2,706,052 A | | 4/1955 | Trautman et al. | |
| 2,748,459 A | * | 6/1956 | Orr | B25H 1/0007 254/134 |
| 2,814,394 A | * | 11/1957 | Witcher | B66C 23/48 254/124 |
| 2,838,278 A | | 6/1958 | Wudel | |
| 2,903,258 A | * | 9/1959 | Jovanovich | B25H 1/0007 248/176.1 |

(Continued)

FOREIGN PATENT DOCUMENTS

DE       3731751       8/1988

OTHER PUBLICATIONS

NPL-Sunex Tools http://:www.sunextools.com/index.ctm?s=detail&subcat=125&item=290; Fuel Tank Adapter; 2016; Sunex Tools.
(Continued)

*Primary Examiner* — Lee D Wilson
*Assistant Examiner* — Thomas Raymond Rodgers
(74) *Attorney, Agent, or Firm* — J. Bennett Mullinax, LLC (57) ABSTRACT

A positioning apparatus for a transmission jack saddle is provided in which a first arm has a pivot joint that allows an angle between a first arm and a second arm to be adjusted and each arm further defining an edge wall having ratchet teeth that allows movement and securement using a locking pawl mechanism.

4 Claims, 7 Drawing Sheets

(56) References Cited

U.S. PATENT DOCUMENTS

| | | | |
|---|---|---|---|
| 3,028,145 A | 4/1962 | Brand | |
| 3,185,318 A * | 5/1965 | Lewis, Sr. | B25H 1/16 |
| | | | 187/244 |
| 3,420,481 A | 1/1969 | Arnes | |
| 3,773,293 A | 11/1973 | Arnes | |
| 3,958,793 A * | 5/1976 | Garate | B66F 5/04 |
| | | | 254/10 B |
| 4,211,126 A * | 7/1980 | Sutz | F04B 47/14 |
| | | | 416/170 R |
| 4,218,043 A * | 8/1980 | LeVert | B66F 1/06 |
| | | | 254/108 |
| 4,239,196 A * | 12/1980 | Hanger | B25H 1/0007 |
| | | | 269/17 |
| 4,269,394 A * | 5/1981 | Gray | B66F 13/00 |
| | | | 254/134 |
| 4,560,151 A | 12/1985 | Grundy | |
| 4,792,130 A | 12/1988 | Ardent | |
| 5,098,065 A * | 3/1992 | Beletich | E21F 13/006 |
| | | | 254/1 |
| 5,139,233 A | 8/1992 | Goss | |
| 5,156,375 A | 10/1992 | Liegel et al. | |
| 5,372,353 A * | 12/1994 | West | B25H 1/0007 |
| | | | 254/10 B |
| 5,513,829 A * | 5/1996 | Hodges | B25H 1/0007 |
| | | | 248/172 |
| 6,347,817 B1 * | 2/2002 | Chou | B60P 7/15 |
| | | | 248/230.6 |
| 6,561,487 B2 | 5/2003 | Siglock | |
| 6,581,908 B1 * | 6/2003 | Francis | B25H 1/0007 |
| | | | 254/134 |
| 6,705,596 B2 * | 3/2004 | Reinikka | B25H 1/0014 |
| | | | 254/133 R |
| 6,926,254 B1 * | 8/2005 | Nymann | B25H 1/0007 |
| | | | 254/124 |
| 7,296,787 B2 * | 11/2007 | Barrios | B25H 1/0014 |
| | | | 254/133 R |
| 7,311,294 B1 * | 12/2007 | Ruan | B60P 7/15 |
| | | | 254/100 |
| 9,016,664 B1 * | 4/2015 | Powers | B05C 13/02 |
| | | | 254/2 B |
| 2004/0256606 A1 | 12/2004 | Kelso | |
| 2009/0020934 A1 * | 1/2009 | Metcalf | B66C 23/48 |
| | | | 269/77 |
| 2014/0084228 A1 | 3/2014 | Hart | |
| 2017/0174485 A1 * | 6/2017 | Vogel | B66F 5/04 |

OTHER PUBLICATIONS

NPL-Norco Quick Adjust Saddle: http://ww.norcoindustries.com/products/model/7525-quick-adjust-saddle.html; 2016.
NPL-Sunex Tools 1000 lb Air/Hyd Transmission Jack; http://www.sunextools.com/salessheets/7797_Sales_Sheet.pdf; 2016.
PCT International Search Report; dated Dec. 21, 2017; 14 pages.

* cited by examiner

ADJUSTABLE POSITIONING ARMS FOR TRANSMISSION JACK SADDLE

RELATED APPLICATIONS

This application claims the benefit of U.S. Application Ser. No. 62/395,422 filed on Sep. 16, 2016 and which is incorporated herein by reference.

FIELD OF THE INVENTION

This invention is directed towards adjustable positioning arms for use with a transmission jack saddle to increase the versatility as it applies to adaption of the saddle with different transmission configuration and to provide greater utility for supporting other under vehicle components that may require servicing.

BACKGROUND OF THE INVENTION

This invention relates generally to transmission jack saddles that are used to secure and move transmissions to and from a vehicle so that a mechanic can access and work on the transmission. Frequently, a transmission jack saddle is used to hold other items such as transfer cases and other heavy or bulky automotive under vehicle parts. Frequently, a transmission jack saddle that may be sized to receive a transmission is ill-suited for holding other items.

An additional problem is that transmission shapes are not uniform so one form of a transmission jack saddle may be poorly designed for certain transmissions or when used to secure other items.

One prior art approach to addressing such problems involves the use of fixed angle arms that are placed within edge walls of the saddle that allow for adjustment of the arms relative to the saddle. The arms typically fit within slots defined along edge walls within the saddle. Such arms provide for a fixed angle and require multiple versions of different angles in order to provide suitable variation and flexibility to accommodate various transmission shapes.

Accordingly, there remains room for improvement and variation within the art.

SUMMARY OF THE INVENTION

It is one aspect of at least one embodiment of the invention to provide a positioning apparatus for a transmission jack saddle comprising: a first arm having a first end adapted for securing within a slot defined an edge wall of a transmission jack saddle; a second arm being pivotally adjustable with respect to the first arm, the second arm further having a ratchet mechanism which interengages with a retaining housing that allows a length of the second arm, relative to the retaining housing, to be adjusted.

It is one aspect of at least one of the present embodiments to provide for an extension arm that can be used with an, existing transmission jack saddle, the arm having a first end and a second end, the two arms connected by a pivot joint that allow the angle between the first arm and second arm to be adjusted.

It is a further aspect of at least one of the present embodiments to provide for an extension arm for a transmission jack saddle where a first end of the arm is secured within a slot defined within an edge wall of a saddle of a transmission jack, the second arm being pivotally adjustable with respect to the first arm, the second arm further having a ratchet mechanism which interengages with a retaining housing that allows a length of the second arm, relative to the end of the retaining housing, to be adjusted. A terminal end of the second arm further defines a retaining member, the retaining member having a width greater than a width of the second retaining arm.

It is a further aspect of at least one embodiment of the present invention to provide for an extension arm for a transmission jack saddle having a release pin as part of the second arm housing, the release pin allowing the securement of the arm in a desired angle relationship.

It is a further aspect of at least one of the present embodiments to provide for a first arm, a second arm being slideably adjustable lengthwise relative to its housing, the first arm having a second end further adapted for engaging a receiving slot defined within a transmission jack saddle.

BRIEF DESCRIPTION OF THE DRAWINGS

A fully enabling disclosure of the present invention, including the best mode thereof to one of ordinary skill, in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 1:
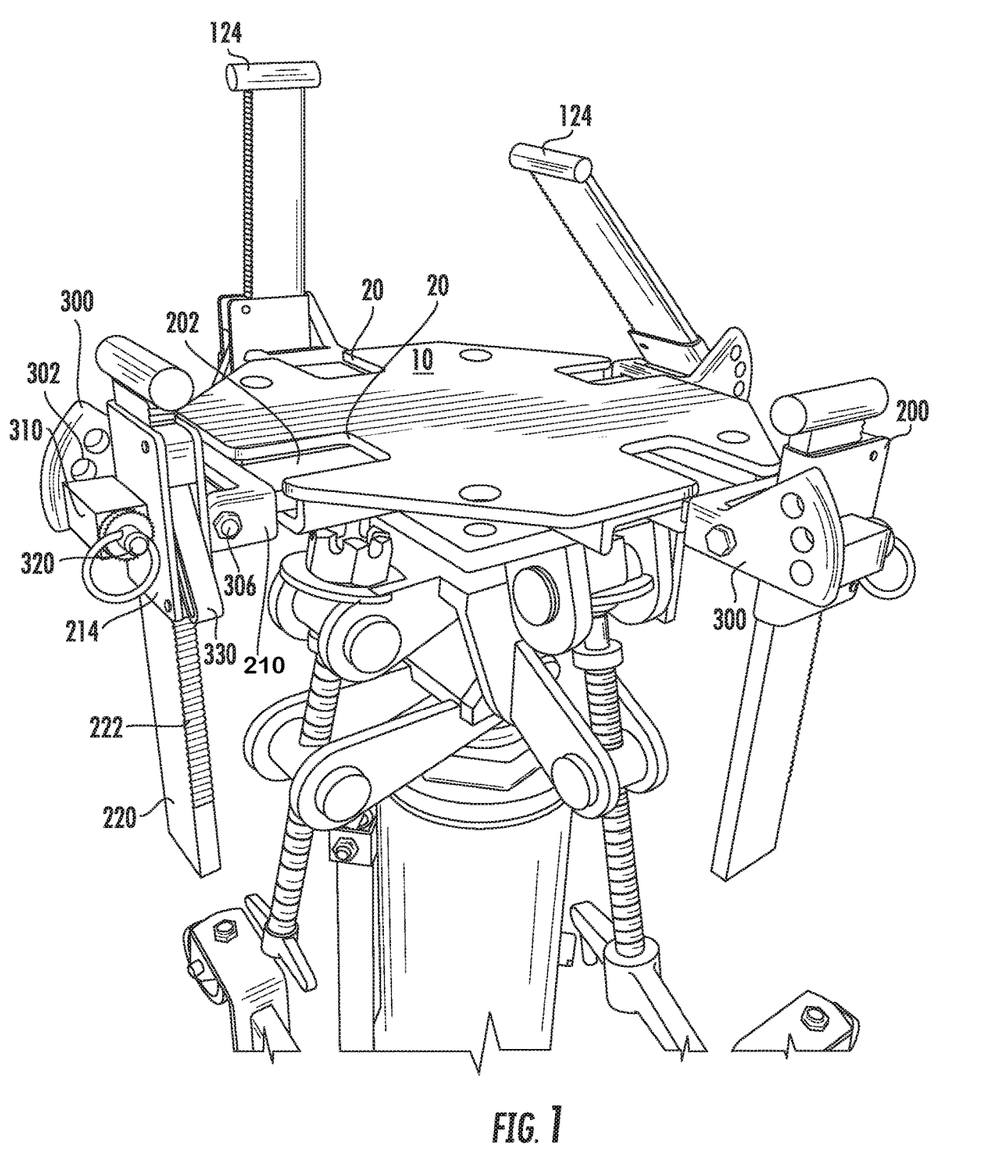
FIG. 1 set forth aspects of a first embodiment of the arm mechanism for use with a transmission jack saddle.
Figure 2:
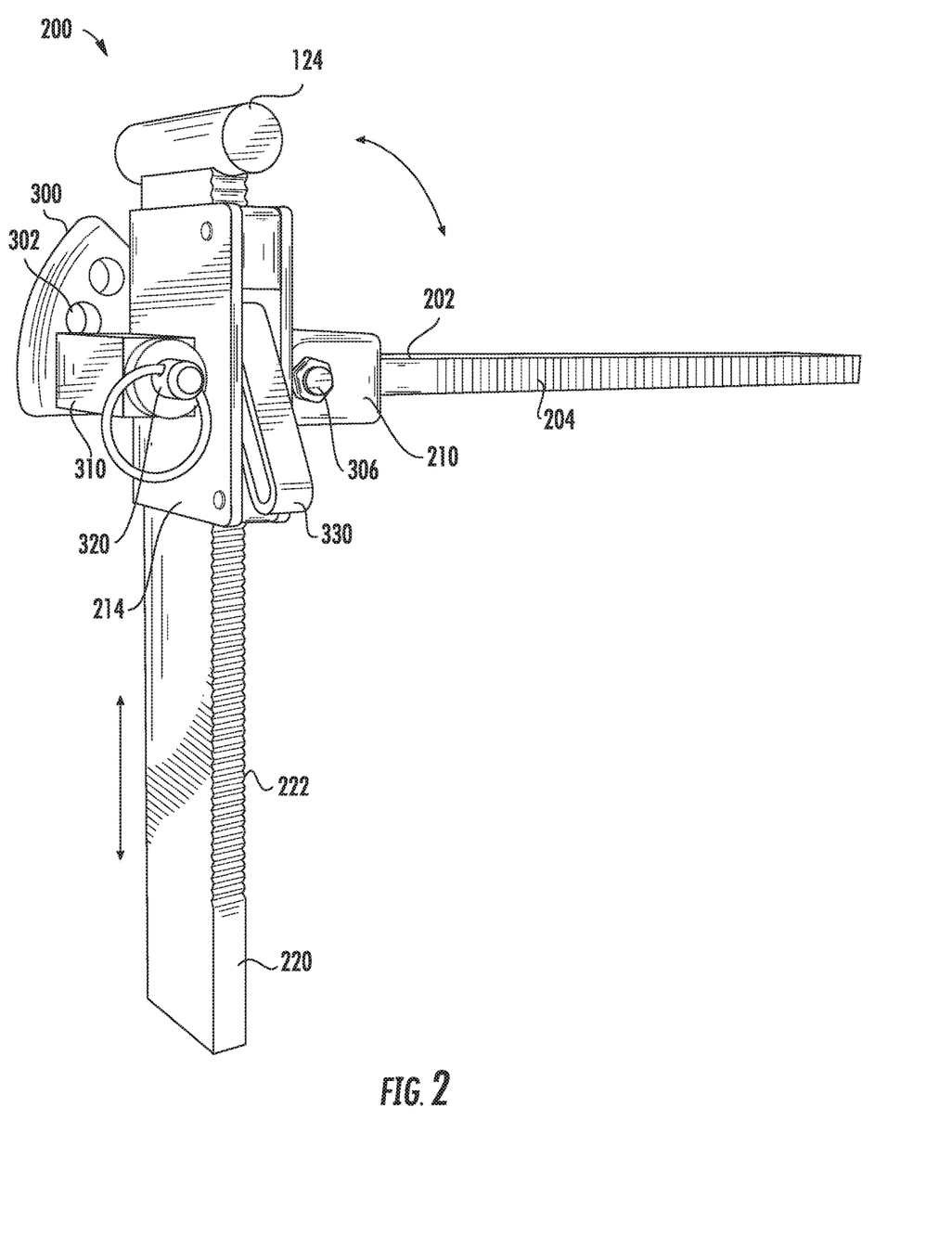
FIGS. 2-3 set forth additional aspects of the first embodiment of the arm mechanism.

As best seen in reference to FIG. 1, a conventional transmission jack saddle 10 is illustrated having a series of edge wall slots 20 that are designed to hold various arms made available by the manufacturer. By way of the present invention, Applicant is providing a plurality of positioning apparatuses 200 which can fit within preexisting slots 20 of a conventional transmission jack saddle 10. As better seen in reference to FIGS. 2-3, a first exemplary embodiment of the apparatus 200 is provided having a first arm 202 and a second arm 220. As seen in the figures, first arm 202 has along one edge of the arm a plurality of teeth 204 which forms part of a ratcheting mechanism for engaging openings 20 within a transmission jack saddle 10. First arm 202 is secured within a housing 210. A pivot 306 allows a position of the first arm 202 to vary with respect to second arm 220. As seen in FIG. 2, housing 210 retains first arm 202 and is in communication with pivot connection 306. A second housing 214 is provided and which is adapted for receiving the second arm 220. As seen in the Figures, second arm 220 defines a plurality of ratchet teeth 222 along one edge of the arm and engages with a corresponding pawl (not illustrated) retained within an interior of housing portion 214. A conventional pawl release mechanism responsive to member 330 allows for the adjustment of the arm 220 within the housing 214.

As seen in the FIG. 1, the angled position of arm 220 relative to arm 202 can be varied along the pivot pin 306. As illustrated, the angled position can vary from substantially flush orientation of arm 220 relative to saddle 10 to a substantially perpendicular orientation. The arms can be designed so as to provide a locked and engaged angle orientation along any desired point from 0 to 90 degrees orientation as described below. Movement of arm 202 relative to arm 220 may be controlled by engagement pin 320.

As seen in FIG. 1, arm 202 can be inserted a variable distance within slot 20 defined by the saddle 10. This sliding arrangement allows the working distance between opposing apparatuses 200 to be adjusted so as to provide for a more secure engagement with a transmission or other supported article. As further seen in reference to FIGS. 1, 4 and 5, the angle of arm 220, relative to arm 202, can also be varied along with a height of arm 220 relative to saddle 10. The ability to vary the angle as well as the height position of arm 220 allows for a single positioning apparatus 200 to provide for a customized engagement and securement of an apparatus such as a transmission. The ratcheting mechanisms associated with arms 202 and 220 allow for rapid adjustments.

Figure 3:
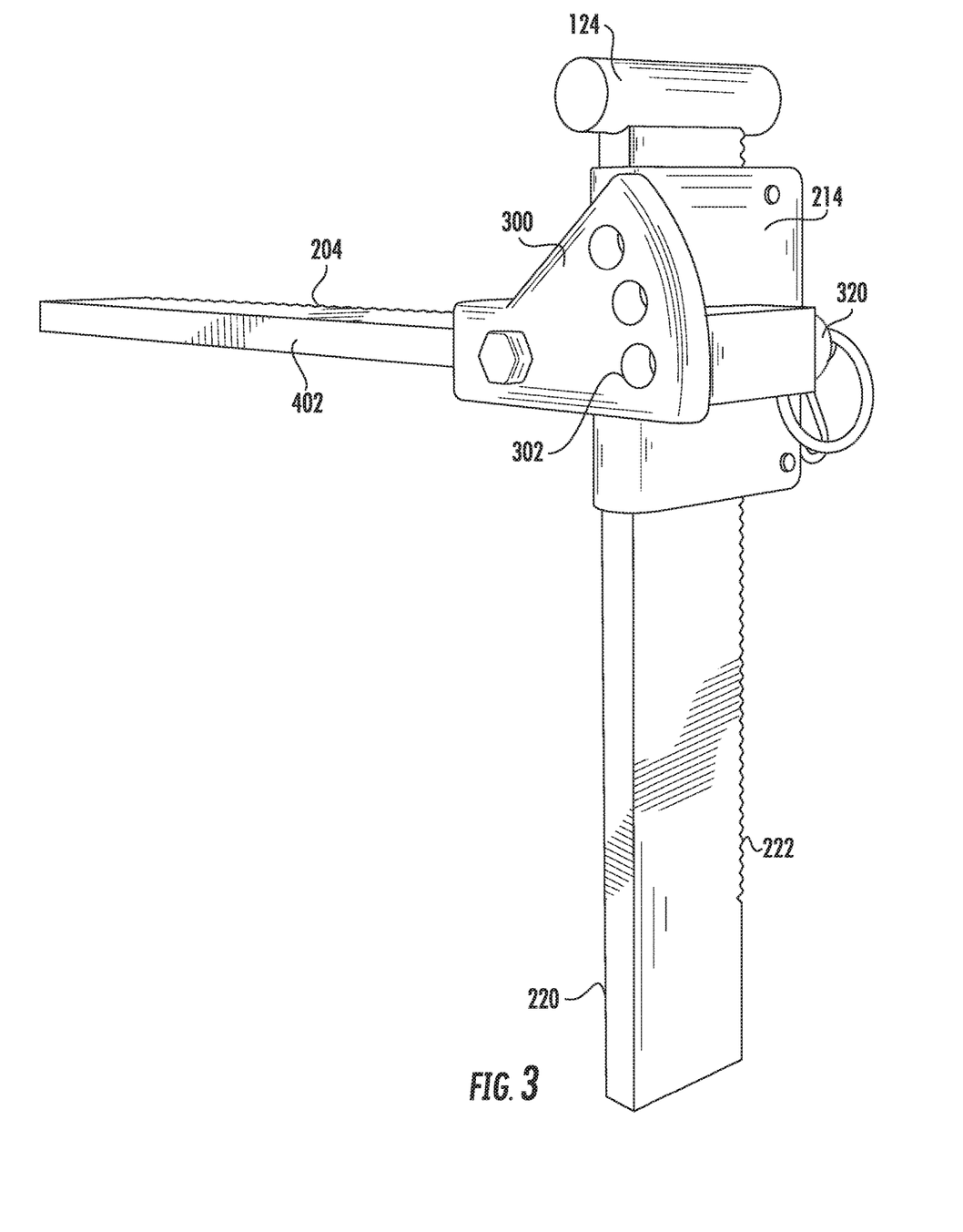

The pivot 306 and spring loaded engagement pin 320 allow for rapid adjustment of the angle of arm 220 relative to arm 202. Engagement pin 320 is retained within an aperture defined within support member 310 carried by housing 214. In exemplary embodiments of the invention, the first arm 202 and the second arm 220 can, pivot, relative to each other by way of a pivot pin 306. The spring loaded engagement pin 320 can engage any of several receiving holes 302 located in the bracket 300. The number and position of the receiving, holes can be varied to provide for the desired positioning angles of arm 220 relative to arm 202. The ability to adjust the relative distances and angles allow for a more versatile and customized adjustment relative to a supported article. This in turn, provides for a safer securement of equipment to the extent the engagement arms 202 and 220 provide for a more customized engagement of a supported article.

As seen in reference to FIG. 1, one orientation of the engagement arms illustrates engagement arm(s) 220 may be substantially parallel to a surface of the saddle 10. By adjusting the relative length of arm 220 within the corresponding housing 214, one can extend the height of arm 220 to accommodate the depth of various transmission configurations. This improves the safety of the associated transmission jack by providing a better support mechanism for distributing weight of a supported article.

As seen in reference to FIG. 1, saddle 10 is illustrated as having four positioning apparatuses 200. The positioning arm apparatus 200 can be completely removed from the saddle to allow for use of different inserts. In addition, each arm 220 can be removed from the associated housing and, if desired, a different ratcheting arm member having a different terminal configuration or end use can be inserted and used with the saddle 10.

As best seen in reference to the FIGS. 2-3, a retaining member 124 may be provided along one terminal end of the second arm 220. While the size and shape of retaining member 124 can be varied, it has been found useful to have the retaining member 124 to have a width greater than a width of arm 220.

Figure 4:
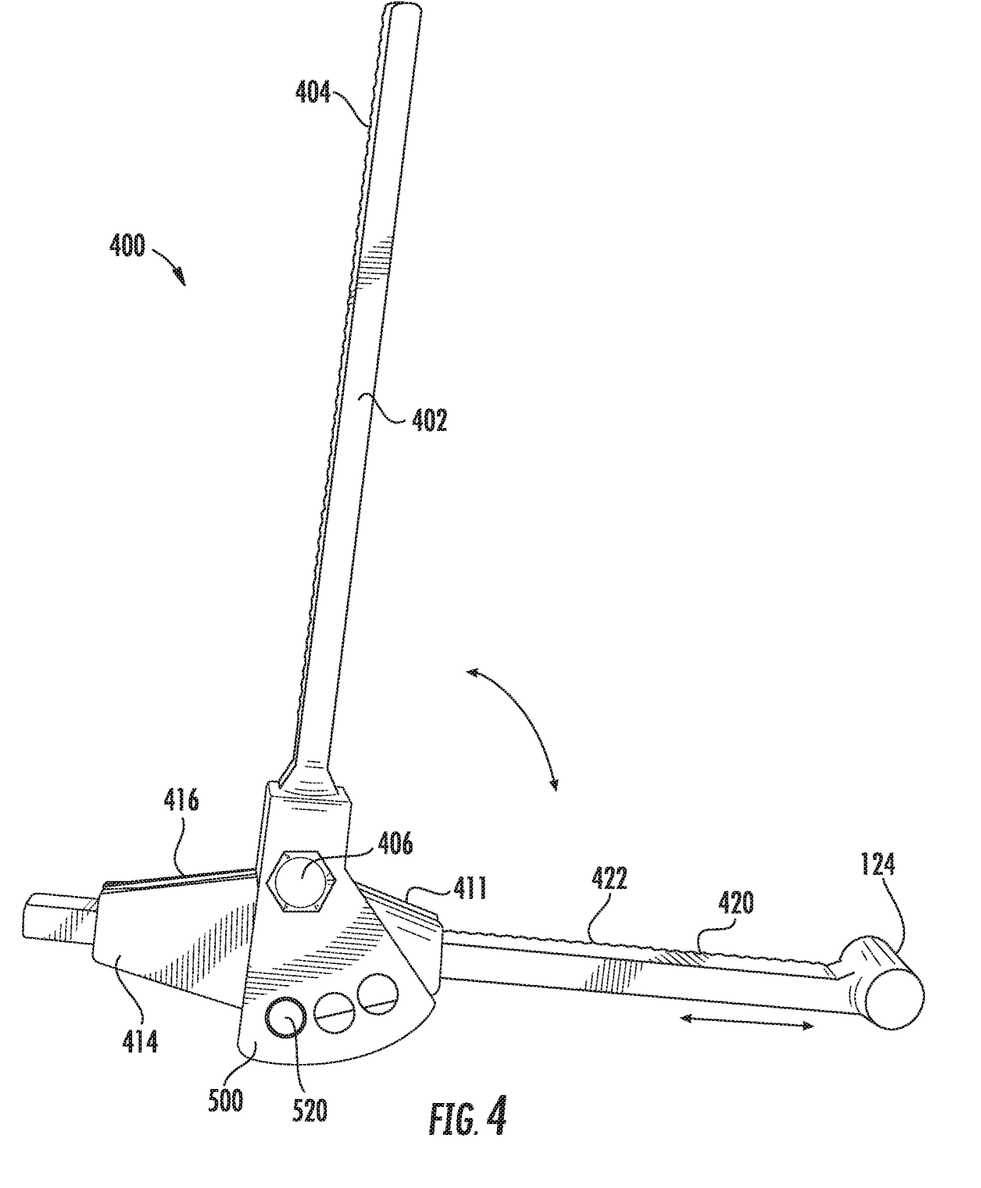
FIGS. 4-7 set forth aspects of a second embodiment of the arm mechanism for use with a transmission jack saddle.
Figure 5:
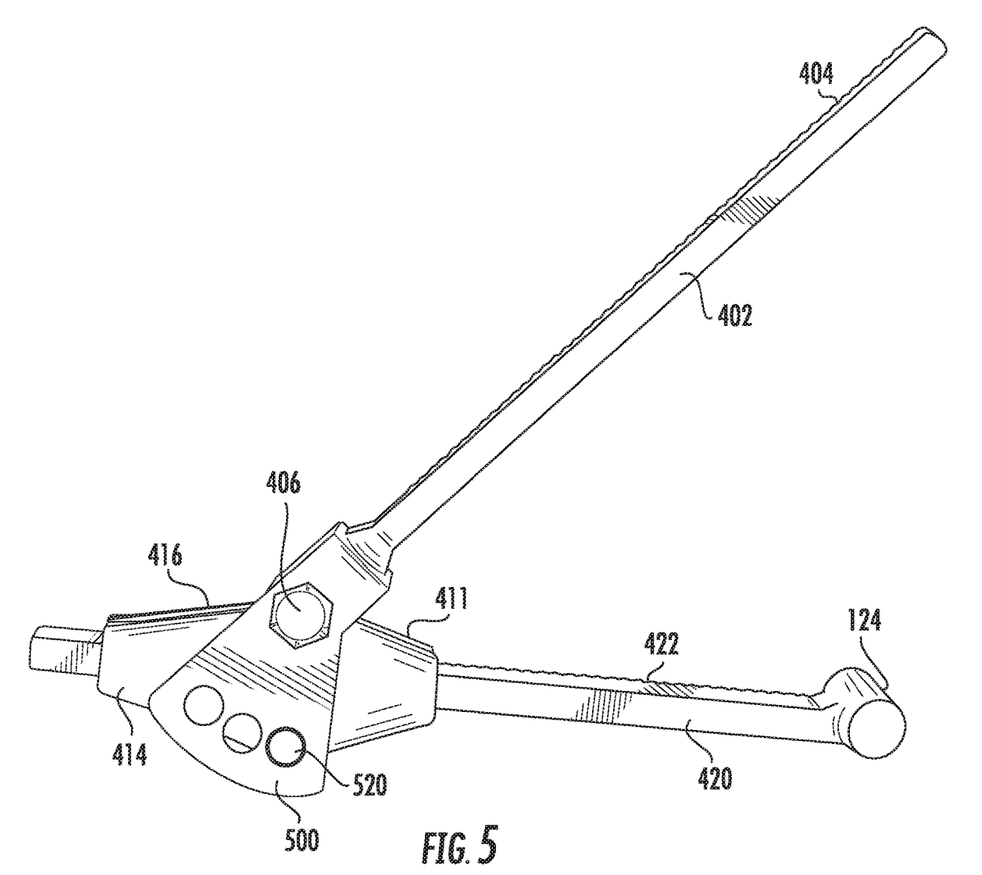
Figure 6:
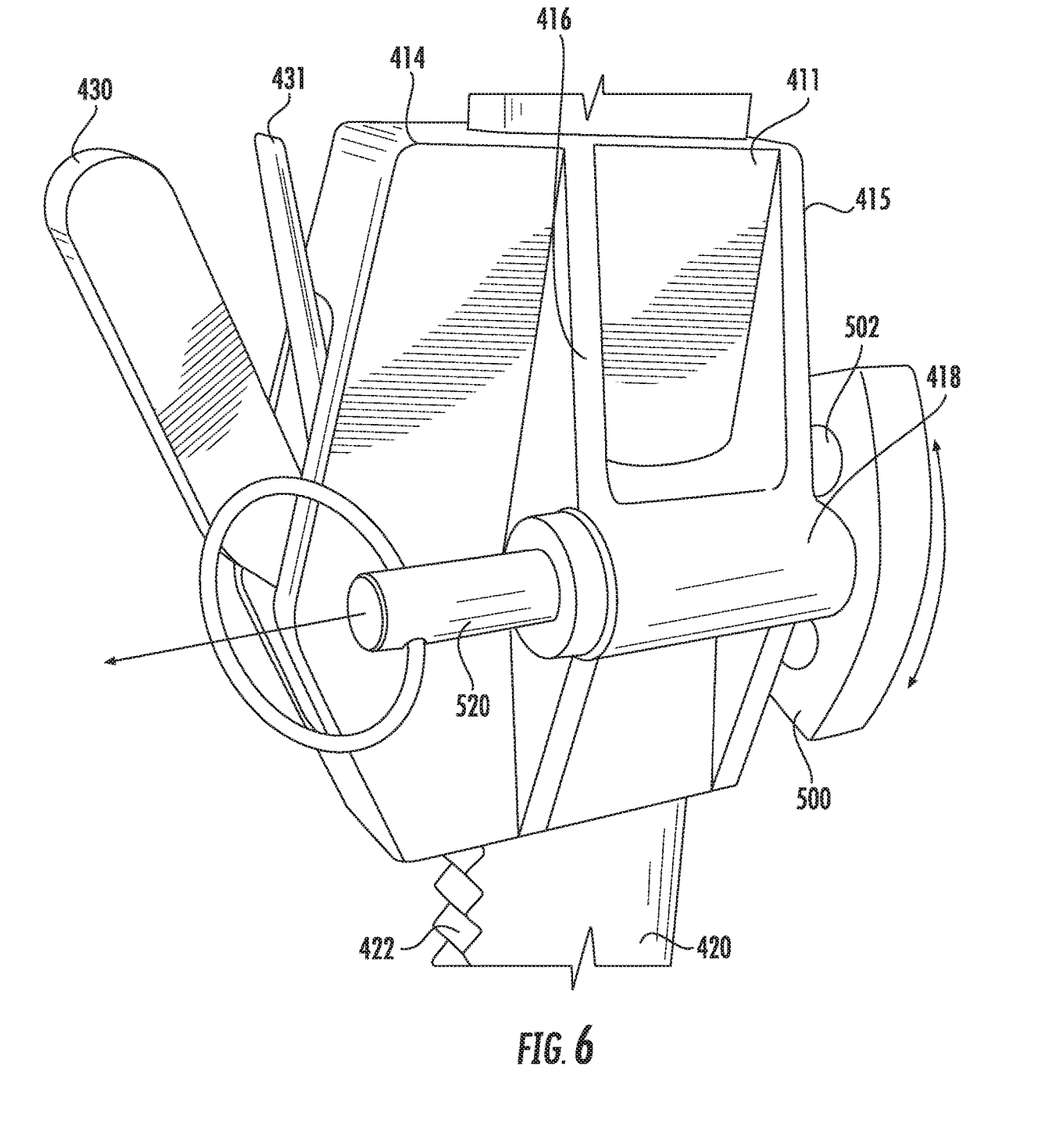

A second embodiment of a positioning apparatus 400 can be seen in reference to FIGS. 4-6. Positioning apparatus 400 has a first arm 402 and a second arm 420. As seen in the figures, first arm 402 has defined along one edge of the arm a plurality of teeth 404 which forms part of a ratcheting mechanism for engaging openings 20 within a transmission jack saddle 10. First arm 402 is connected to a bracket 500 that is in turn pivotally connected to a housing 414. Housing 414 supports the second arm 420 and allows the sliding engagement of arm 420 within the housing 414. As seen in FIGS. 4-5, the second arm 420 defines a plurality of ratchet teeth 422 along one edge of the arm and engages with a corresponding pawl retained within an interior of housing portion 414. A conventional pawl release mechanism 430 allows for the engagement of spring 431 to allow adjustment of the second arm 420 within the housing 414.

As seen in FIG. 4, the angled position of arm 420 relative to arm 402 can be varied along the pivot point of pin 406. The angled position can vary from a substantially flush orientation of arm 420 relative to a saddle 10 to a substantially perpendicular orientation and can be designed so as to provide a locked and engaged angle orientation along any desired point from 0 to 90 degrees orientation and as seen similar to that of the first embodiment described above.

Similar to the first embodiment as seen in FIG. 1, arm 402 can be inserted a variable distance within slot 20 defined by saddle 10. This sliding arrangement allows the working distance between opposing positioning apparatus arms to be adjusted so as to provide for more secure engagement with a transmission or other supported article. Similar to the first embodiment, the angle of arm 420 relative to arm 402 can also be varied along with a height of arm 420 relative to saddle 10. The ability to vary the angle as well as the height and position of arm 420 allows for a single positioning apparatus 400 to provide for a customized engagement and securement of an apparatus such as a transmission. The ratcheting mechanisms associated with arms 402 and 420 allow for rapid adjustments.

Bracket 500 operatively engages arm 402 such that bracket 500 and arm 402 will pivot together along pivot pin 406. Pivot pin 406 is secured through an aperture defined by housing 414 which allows relative movement between arm 420/housing 414 and arm 402/bracket 500.

Figure 7:
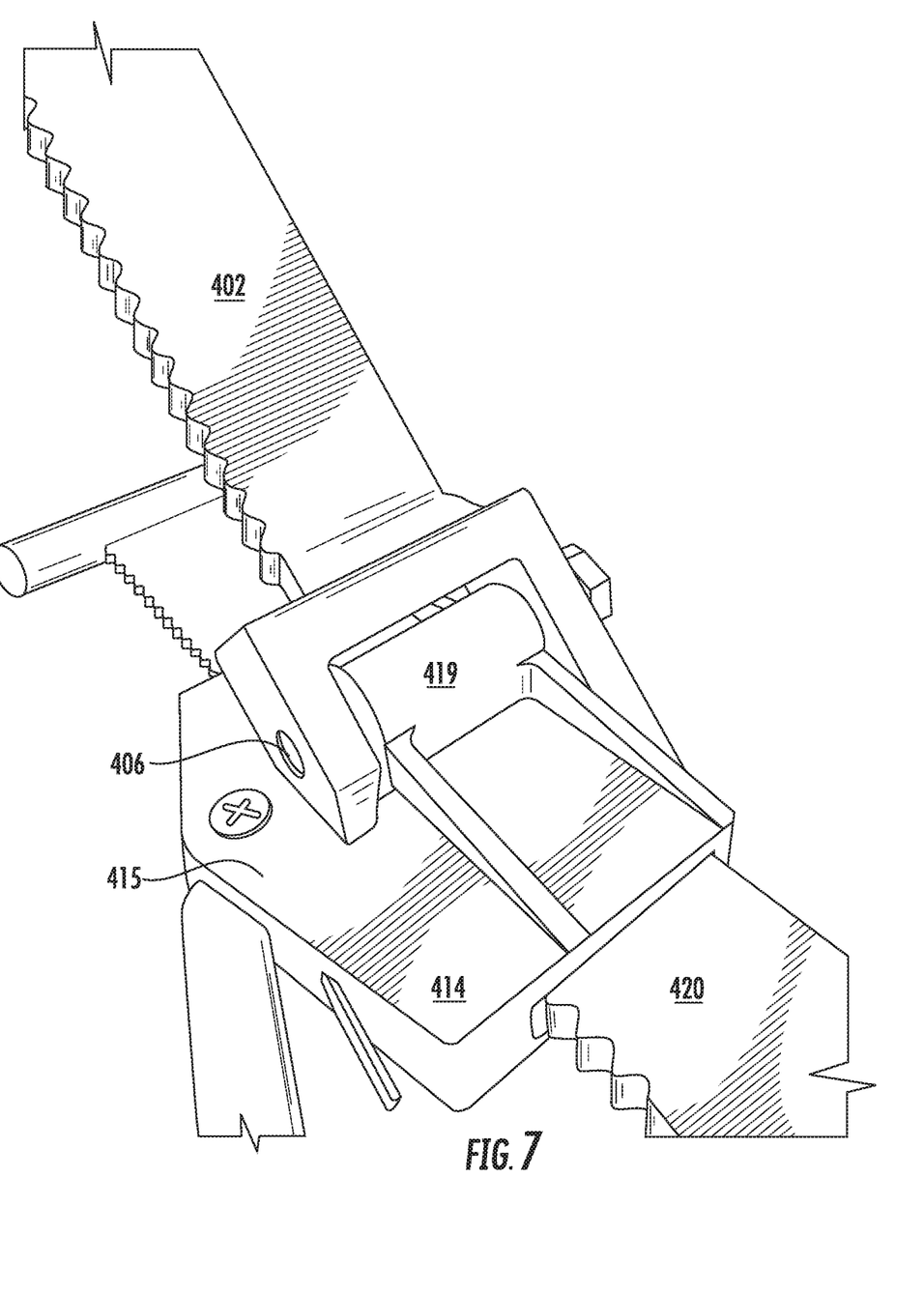

As best seen in reference to FIG. 6, housing 414 comprises a housing having a rectangular slot through which arm 420 may be secured and positioned. On a first side 411 of housing 414, a raised ridge 416 supports a first cylinder 418 through which spring loaded locking pin 520 is inserted. As seen in FIG. 7, a second side 415 of housing 414 defines a second cylinder 419 through which the pivot pin 406 is inserted.

As best seen in reference to FIGS. 4-6, a terminus of locking pin 520 is adapted for interengagement within one of several securement apertures 502 defined within the bracket 500. The angle of arm 420 can be adjusted relative to arm 402 and secured in any desired position that corresponds to the placement of pin 520 into one of the securement apertures 502. As illustrated, bracket 500 defines three different apertures 502 that allow three predefined angled positions to be selected. However, by varying the size of the bracket 500 and the number of securement apertures 502, any useful preset angle can be provided with respect to arms 402 and 420. A retaining member 124 may be provided along one terminal end of the second arm 420. While the size and shape of retaining member 124 can be varied, it has been found useful to have the retaining member 124 to have a width greater than a width of arm 420.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention as set forth herein. In addition, it should be understood that aspects of the various embodiments may be interchanged, either in whole, or in part. Therefore, the spirit and scope of the invention should not be limited to the description of the preferred versions contained therein.

That which is claimed:

1. A positioning apparatus for a transmission jack saddle comprising:
   a transmission jack saddle;
   a plurality of first arms having a first end secured within a slot defined within an edge wall of the transmission jack saddle, each of the plurality of first arms being further secured within a respective first housing, each slot defined within a separate edge wall of a saddle;
   a plurality of second arms being adjustable with respect to one of the plurality first arms by a pivot supported by the corresponding first arm and the corresponding first housing, each of the plurality of second arms further having a toothed edge wall which interengages with a pawl mechanism within a respective second housing that allows a length of the second arm, relative to the second housing, to be adjusted;
   wherein the second housing has affixed thereto a support member, the support member defining an aperture therethrough, the aperture retaining therein a release pin;
   wherein each of the second arms and the corresponding second housing can pivot relative to the first arm and the first housing when the release pin is in a disengaged position, and each of the second arms having a terminal, end for engaging a transmission.

2. The positioning apparatus according to claim 1 wherein the terminal end of each of the plurality of second arms further defines a terminal retaining member, the terminal retaining member having a width greater than a width of the respective second arm.

3. The positioning apparatus according to claim I wherein at least one of the first arms and at least one of the second arms each define a longitudinal axis, longitudinal axis of the first arm and the second arm intersect with one another.

4. A positioning apparatus for a transmission jack saddle comprising:
   a transmission jack saddle;
   a plurality of first arms having a first end secured within a slot defined within an edge wall of the transmission jack saddle, each of the plurality of first arms being further secured within a respective first housing, each slot defined within a separate edge wall of a saddle;
   a plurality of second arms being adjustable with respect to one of the plurality first arms by a pivot supported by the corresponding first arm and the corresponding first housing, each of the plurality of second arms further having a toothed edge wall which interengages with a pawl mechanism within a respective second housing that allows a length of the second arm, relative to the second housing, to be adjusted;
   wherein at least one of the first arms and at least one of the second arms each define a longitudinal axis, the longitudinal axis of the first arm and the longitudinal axis of the second arm intersect with one another;
   wherein each of the second arms and the corresponding second housing can pivot relative to the first arm and the first housing when a release pin is in a disengaged position, and each of the second arms having a terminal end for engaging a transmission;
   wherein a first pair of slots are positioned on respective first opposite side walls of the saddle and a second pair of slots are positioned on respective second pair of opposing side walls of the saddle, and;
   wherein the second housing has affixed thereto to a support member, the support member defining an aperture therethrough, the aperture retaining therein the release pin.

\* \* \* \* \*